(12) United States Patent
Sun et al.

(10) Patent No.: US 9,651,823 B2
(45) Date of Patent: May 16, 2017

(54) BACKLIGHT SOURCE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Wenjia Sun, Beijing (CN); Yu Zhang, Beijing (CN); Daekeun Yoon, Beijing (CN); Qing Ma, Beijing (CN); Wenwen Ma, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 120 days.

(21) Appl. No.: 14/408,713

(22) PCT Filed: Jun. 27, 2014

(86) PCT No.: PCT/CN2014/080906
§ 371 (c)(1),
(2) Date: Dec. 17, 2014

(87) PCT Pub. No.: WO2015/096435
PCT Pub. Date: Jul. 2, 2015

(65) Prior Publication Data
US 2015/0346551 A1    Dec. 3, 2015

(30) Foreign Application Priority Data
Dec. 23, 2013    (CN) .......................... 2013 1 0717990

(51) Int. Cl.
*G09F 13/04* (2006.01)
*G02F 1/1335* (2006.01)
(Continued)

(52) U.S. Cl.
CPC .......... *G02F 1/133608* (2013.01); *F21V 7/04* (2013.01); *F21V 11/00* (2013.01);
(Continued)

(58) Field of Classification Search
CPC ......... G02F 1/133608; G02F 1/133605; G02F 1/133602; G02F 1/133606; G02F 2001/133614; F21V 7/04; F21V 11/00
(Continued)

(56) References Cited

U.S. PATENT DOCUMENTS 7,118,263 B2    10/2006  Tsai et al.
2006/0018130 A1*  1/2006  Lee ................... G02F 1/133604
                                                    362/632
(Continued)

FOREIGN PATENT DOCUMENTS

CN    1523425 A    8/2004
CN    1588658 A    3/2005
(Continued)

OTHER PUBLICATIONS

International Search Report, International Preliminary Report on Patentability and Written Opinion of the International Searching Authority of PCT/CN2014/080906 in Chinese, mailed Sep. 3, 2014.
(Continued)

*Primary Examiner* — Andrew Coughlin
*Assistant Examiner* — Hana Featherly
(74) *Attorney, Agent, or Firm* — Collard & Roe, P.C.

(57)    ABSTRACT

A backlight source and a display device are provided. The backlight source includes a backplate (1), a light source (2) and a diffuser plate (3). The light source (2) is provided on a face of the backplate (1), the diffuser plate (3) is parallel to the face of the backplate (1), and the diffuser plate (3) is provided at a side of the backplate (1), where the light source (2) is provided, and is opposite to light source (2); and a
(Continued)

support pole (31) is further provided between the diffuser plate (3) and the backplate (1), and the support pole (31) and the diffuser plate (1) are made of a same material and formed integrally.

18 Claims, 2 Drawing Sheets

(51) Int. Cl.
 *F21V 7/04* (2006.01)
 *F21V 11/00* (2015.01)
(52) U.S. Cl.
 CPC .. *G02F 1/133602* (2013.01); *G02F 1/133605* (2013.01); *G02F 1/133606* (2013.01); *G02F 2001/133614* (2013.01)
(58) Field of Classification Search
 USPC ........................................................ 362/97.1
 See application file for complete search history.

(56) References Cited

U.S. PATENT DOCUMENTS

2009/0072250 A1* 3/2009 Inoue ................. H01L 25/0753
 257/88
2010/0142188 A1* 6/2010 Ha ....................... G02B 3/0043
 362/97.2
2014/0009837 A1 1/2014 Liu et al.

FOREIGN PATENT DOCUMENTS

| CN | 1599066 A | 3/2005 |
| CN | 201138407 Y | 10/2008 |
| CN | 102278704 A | 12/2011 |
| CN | 202927639 U | 5/2013 |
| CN | 103150967 A | 6/2013 |
| CN | 103712128 A | 4/2014 |
| KR | 10-2007-0091454 A | 9/2007 |

OTHER PUBLICATIONS

Chinese Office Action of Chinese Application No. 201310717990.6, mailed Jun. 15, 2015 with English translation.

English translation of the International Preliminary Report on Patentability and Written Opinion of the International Searching Authority of PCT/CN2014/080906, issued Jun. 28, 2016.

* cited by examiner

BACKLIGHT SOURCE AND DISPLAY DEVICE

CROSS REFERENCE TO RELATED APPLICATIONS

This application is the National Stage of PCT/CN2014/080906 filed on Jun. 27, 2014, which claims priority under 35 U.S.C. §119 of Chinese Application No. 201310717990.6 filed on Dec. 23, 2013, the disclosure of which is incorporated by reference.

TECHNICAL FIELD

Embodiments of the present disclosure relate to a backlight source and a display device.

BACKGROUND

A liquid crystal display device is composed mainly of a display panel and a backlight source. The display panel is usually provided above the backlight source. There are two common types for arranging a light source in the backlight source, that is, direct-light-type and side-light-type.

A direct-light-type backlight source is illustrated in FIG. 1. A light source 2 is provided on a backplate 1, and the light emitted from the light source 2 directly shines on the display panel 6 above the backlight source. Commonly, a diffuser plate 3 is provided between the light source 2 of the backlight source and the display panel 6 and used to blend and diffuse the light emitted from the light source 2, so that the light emitted from the light source 2 shines on the display panel 6 more evenly. Presently, as to the direct-light-type backlight source in a large-sized display panel, due to the large size, after the display panel 6 is provided above the backlight source, the central region of the display panel 6 can sink under the action of its gravity, this causes a curvature with higher periphery and lower center and thus influences the picture display quality.

Conventional solution is to provide a support between the backplate and the diffuser plate, but the support needs drilling into the backplate and being fixed using a fastener or a screw, and this depresses the assembly efficiency of the backlight source greatly. Further, a contact shade can occur at the location where the support contacts with the diffuser plate, and thus affects the picture display quality.

SUMMARY

An embodiment of the present disclosure provides a backlight source, which includes a backplate, a light source and a diffuser plate; the light source is provided on a face of the backplate, the diffuser plate is parallel to the face of the backplate, and the diffuser plate is provided at a side of the backplate, where the light source is provided, and is opposite to light source; and a support pole is further provided between the diffuser plate and the backplate, and the support pole and the diffuser plate are made of a same material and are formed integrally.

Another embodiment of the present disclosure further provides a display device, which includes a display panel and the above-mentioned backlight source, and the display panel is provided above the backlight source.

BRIEF DESCRIPTION OF THE DRAWINGS

In order to clearly illustrate the technical solution of the embodiments of the disclosure, the drawings needed in descriptions for the embodiments or related technologies will be briefly described in the following; it is obvious that the described drawings are only related to some embodiments of the disclosure and thus are not limitative of the disclosure.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In view of the above-mentioned technical problems, the embodiments of the present disclosure provide a backlight source and a display device. In such a backlight source, the support pole and the diffuser plate are formed integrally using a same material, and this not only greatly improves the assembly efficiency of the backlight source, but also increases the picture quality.

Embodiment 1

Figure 2:
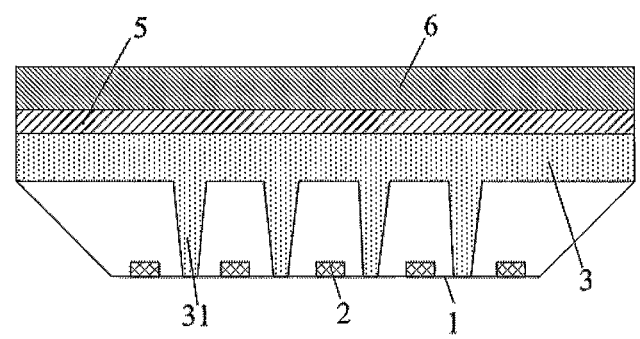
FIG. 2 is a structural view schematically illustrating a backlight source according to a first embodiment of the present disclosure.

This embodiment provides a backlight source, as shown in FIG. 2, the backlight source includes a backplate 1, a light source 2 and a diffuser plate 3; the light source 2 is provided on a face of the backplate 1, the diffuser plate 3 is parallel to the face of the backplate 1, and the diffuser plate 3 is provided at a side of the backplate 1, where the light source 2 is provided, and is opposite to the light source 2; and a support pole 31 is further provided between the diffuser plate 3 and the backplate 1. For example, the support pole 31 and the diffuser plate 3 may employ a same material, and be integrally formed.

Figure 1:
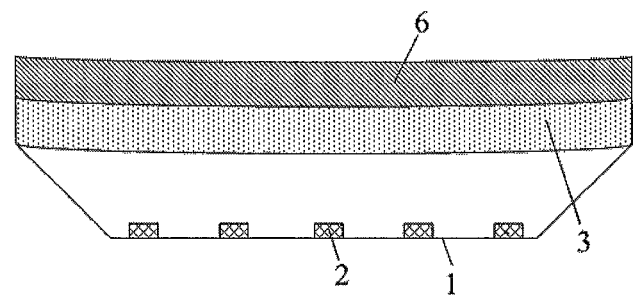
FIG. 1 is a structural view schematically illustrating a backlight source in a related technology.

The support pole 31 and the diffuser plate 3 are formed integrally through injection molding, for example, and the support pole 31 extends to the face of the backplate 1, where the light source 2 is provided, along a direction perpendicular to the diffuser plate 3. As shown in FIG. 1, the backplate 1 may have a cross-sectional shape of inverted trapezoid. In the assembling process, the diffuser plate 3 integrally formed with the support pole 31 may be directly placed onto the backplate 1, without extra fastening the support pole 31 and the diffuser plate 3, and the assembly is very convenient. In addition, that the support pole 31 and the diffuser plate 3 are integrally formed by injection molding, with respect to the situation in which the support pole 31 is provided separately and requires additional contact and connection with the diffuser plate 3, brings no contact shade between the support pole 31 and the diffuser plate 3, and thus improves the picture quality.

The backlight source of this embodiment includes a plurality of the light sources 2 and a plurality of the support poles 31. The plurality of the light sources 2 are evenly and equally spaced; and because the plurality of the support poles 31 and the diffuser plate 3 are integrally formed, the ends of the plurality of the support poles 31, connected with the diffuser plate 3, are fixed ends, and the ends of the support poles 31 opposite to the fixed ends are free ends. In this embodiment, the free ends of the plurality of the support poles 31 are located into the spacing regions between the plurality of the light sources 2 of the backplate 1 respectively. In this way, the free ends of the support poles 31 and the light sources 2 can be located at different positions of the backplate 1, respectively, and thus do not shield or interfere with each other.

It is to be illustrated, the display panel 6 is provided above the backlight source, the support poles 31 are required to be able to support the entire display panel 6, and at the same time, it's also necessary to prevent the display panel 6 from sinking towards the backlight source due to insufficient partial support, so the quantity of the support poles 31 is determined according to the dimension of the display panel 6. If the display panel 6 has a larger dimension, more support poles 31 are required; and if the display panel 6 has a smaller dimension, less support poles 31 are required, as long as it's sufficient to support the entire display panel 6 and to prevent a partial display panel 6 from sinking. For instance, eight support poles are enough for a 55-inch direct-light-type product.

In one example, the plurality of the support poles 31 are identically shaped and equally spaced, and an orthographic projection of a support pole 31 onto the backplate 1 is located in a spacing region between the light sources 1. In this way, it's possible to prevent a partial display panel provided above the backlight source from sinking, and further, to prevent the space right above of a light source 2 from being shielded by a support pole 31, so that most of the light emitted from the light source 2 can directly shine on the region of the diffuser plate 3 except for the support pole 31, and only a fraction of the light can shine on the support pole 31, pass through the support pole 31 and then shine on the region of the diffuser plate 3, corresponding to the support pole 31.

In this embodiment, the support pole 31 is shaped in various cylindrical structures, such as inverted frustum of cone, cylindrical shape and inverted frustum of pyramid. The support pole 31 having the shape of an inverted frustum of cone or an inverted frustum of pyramid, as described herein, means that the sectional area of the fixed end of the support pole 31 is greater than that of the free end of the support pole 31. The support pole 31 of such a shape can make the connection between the support pole 31 and the diffuser plate 3 even more firm. The height of the support pole 31 is configured to enable the diffuser plate 3 to evenly mix and diffuse the light emitted from the light source 2. For example, the setting of the height of the support pole 31 is determined according to the arrangement density of the light sources 2 on the backplate 1 and the light-emitting performance of the light sources 2, and eventually, it's required that the diffuser plate 3 is able to evenly blend and diffuse the light emitted from the light source 2. Additionally and generally, according to the arrangement density of the light sources 2 on the backplate 1, the contact surface between the free end of the support pole 31 and the face of the backplate 1, where the light sources 2 are provided, has a diameter ranging from 1.5 mm to 2.5 mm. The diameter has a dimension smaller than the distance between two adjacent light sources 2. As a result, the free end of the support pole 31 is located in the spacing region between the light sources 2 on the backplate 1.

The support pole 31 and the diffuser plate 3 are formed using polycarbonate PC, styrol copolymer MS or polystyrene PS, for example. These materials have the performance of evenly blending and diffusing the light emitted from the light source 2.

In this embodiment, an optical film 5 may also be arranged above the diffuser plate 3, and the optical film 5 is configured for performing an optical processing to the light passing through the diffuser plate 3. The optical films 5 usually includes some light diffusing sheets, prism sheets etc., and the optical film 5 can further blend, diffuse and reflect the light passing through the diffuser plate 3, so that the light emitted from the light source 2 shines on the display panel 6 more evenly, and also the light utilization rate can be improved. The picture quality can be further improved.

Embodiment 2

Figure 3:
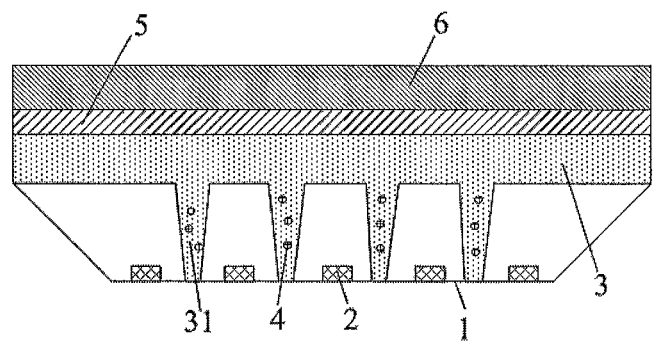
FIG. 3 is a structural view schematically illustrating a backlight source according to a second embodiment of the present disclosure.

This embodiment provides a backlight source, and as shown in FIG. 3, the backlight source may include a structure essentially identical to that of the backlight source provided in the first embodiment, except for light-emitting particles 4. Accordingly, repetitive description of identical parts will be omitted herein, and the same terms and reference numerals are used to represent identical parts.

In the second embodiment, the material forming the support pole 31 is also added with light-emitting particles 4 therein, and the light-emitting particles 4 are configured to be able to give out light when irradiated by the light source 2. The light-emitting particles 4 may employ rare-earth element neodymium or europium and etc. These materials stick to the anti-stokes effect, that is to say, under the irradiation of the light source 2, a luminous center of these materials absorbs two or more photons, then reaches a luminous energy level after radiationless relaxation, and can emit an optical photon until the transition from the energy level to the ground state.

In the first embodiment, a fraction of the light shines on the support pole 31 and travels therein, or is absorbed or reflected by the support pole 31, and as a result, this may cause a brightness difference between the region of the diffuser plate 3 provided with the support pole 31 and the region provided with no support pole 31. In contrast to the first embodiment, in the backlight source according to the second embodiment, the support pole 31 per se also acts as a light source by the addition of the light-emitting particles 4, thus it's possible to depress or eliminate the brightness difference between the region of the diffuser plate 3 provided with the support pole 31 and the region provided with no support pole 31, and this improves the picture quality.

Embodiment 3

Figure 4:
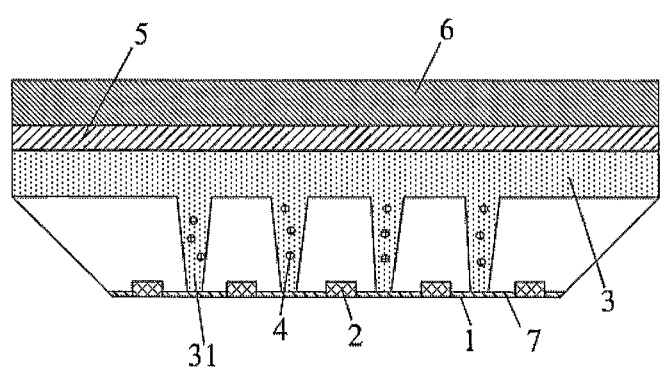
FIG. 4 is a structural view schematically illustrating a backlight source according to a third embodiment of the present disclosure.

This embodiment provides a backlight source, and as shown in FIG. 4, the backlight source may include a structure essentially identical to that of the backlight source provided in the second embodiment, except for the reflector sheet 7. Accordingly, repetitive description of identical parts will be omitted herein, and the same terms and reference numerals are used to represent identical parts.

In the third embodiment, a reflector sheet 7 is further provided between the backplate 1 and the diffuser plate 3, and the reflector sheet 7 is provided with a through hole at a region corresponding to the light source 2, the light emitted from the light source 2 is configured to pass through the through hole and point to the diffuser sheet 3, and the free end of the support pole 31 contacts with the reflector sheet 7.

The reflector sheet 7 is, for example, provided to be closely fitted to the backplate 1, the provision of the reflector sheet 7 enables the light emitted from the light source 2 and shone on the backplate 1 to be reflected to the diffuser plate 3 by the reflector sheet 7, so as to improve the utilization rate of the light. Thereby, the picture quality is further improved.

The backlight sources according to the first to the third embodiments provide the following beneficial effects: by integrally molding the support pole and the diffuser plate using a same material, it's only required to place the diffuser plate and the support pole that are integrated onto the backplate during the assembling process, without the need of fixing the support pole to the diffuser plate additionally, so the assembly efficiency of the backlight source is increased greatly; and additionally, the support pole and the diffuser plate which are formed integrally also eliminate the occurrence of contact shade between the support pole and the diffuser plate, and thus improves the picture quality.

Embodiment 4

This embodiment provides a display device including a display panel and further including a backlight source according to any one of the first to third embodiments, and the display panel is provided above the backlight source.

The display device improves the assembly efficiency and also improves the picture display quality by employing the backlight source according to any one of the first to third embodiments.

The display device may be any product or component having display function, such as a liquid crystal panel, a cell phone, a tablet computer, a television, a display, a notebook computer, a digital photo frame and a navigator.

According to the above descriptions, the embodiments of the disclosure can at least provide the following structures.

(1) A backlight source includes a backplate, a light source and a diffuser plate; the light source is provided on a face of the backplate, the diffuser plate is parallel to the face of the backplate, and the diffuser plate is provided at a side of the backplate, where the light source is provided, and is opposite to light source; and a support pole is further provided between the diffuser plate and the backplate, and the support pole and the diffuser plate are made of a same material and are formed integrally.

(2) In the backlight source according to (1), the support pole and the diffuser plate are formed integrally through injection molding, and the support pole extends to the face of the backplate, provided with the light source, along a direction perpendicular to the diffuser plate.

(3) The backlight source according to (2) includes a plurality of the light sources and a plurality of the support poles, the plurality of the light sources is evenly and equally spaced, and free ends of the plurality of the support poles are located in spacing regions between the light sources respectively.

(4) In the backlight source according to (3), the plurality of the support poles is identically shaped and equally spaced, and orthographic projections of the support poles onto the backplate are located in the spacing regions between the light sources.

(5) In the backlight source according to any one of (1) to (4), a shape of the support pole includes an inverted frustum of cone shape, a cylinder shape, and an inverted frustum of pyramid shape.

(6) In the backlight source according to any one of (1) to (5), a height of the support pole is configured to enable the diffuser plate to evenly mix and diffuse light emitted from the light source.

(7) In the backlight source according to (6), the support pole and the diffuser plate are formed using a material of polycarbonate, styrol copolymer or polystyrene.

(8) In the backlight source according to any one of (1) to (7), a material forming the support pole includes light-emitting particles which are configured to be able to give out light when irradiated by the light source.

(9) In the backlight source according to (8), the light-emitting particles adopt neodymium or europium.

(10) In the backlight source according to any one of (1) to (9), a reflector sheet is further provided between the backplate and the diffuser plate, and the reflector sheet is provided with a through hole at a region corresponding to the light source, the light emitted from the light source is configured to pass through the through hole and point to the diffuser plate, and an free end of the support pole contacts with the reflector sheet.

(11) In the backlight source according to any one of (1) to (10), an optical film is provided above the diffuser plate and configured for performing an optical processing for the light passing through the diffuser plate.

(12) A display device includes a display panel and a backlight source according to any one of (1) to (11), and the display panel is provided above the backlight source.

A general illustration and specific embodiments have been used to provide a detailed description about the present disclosure in the foregoing paragraphs; however, it is obvious for the skilled in this art to make modifications or improvements based on the present disclosure. Accordingly, these modifications or improvements made without departing from the spirit of the present disclosure each belongs to the scope of the present disclosure.

The present application claims the priority of the Chinese Patent Application No. 201310717990.6 filed on Dec. 23, 2013, the entirety of which is incorporated herein by reference as a part of the present application.

What is claimed is:

1. A backlight source comprising a backplate, a light source and a diffuser plate, wherein the light source is provided on a face of the backplate, the diffuser plate is parallel to the face of the backplate, and the diffuser plate is provided at a side of the backplate, where the light source is provided, and is opposite to light source; and a support pole is further provided between the diffuser plate and the backplate, and the support pole and the diffuser plate are made of a same material and are formed integrally, wherein the support pole comprises light-emitting particles embedded therein, the light-emitting particles are configured to give out light in response to being irradiated by the light source, wherein the support pole is of a tapered shape and has a fixed end that is connected to the diffuser plate and a free end opposite to the fixed end, the sectional area of the fixed end is greater than that of the free end.

2. The backlight source according to claim 1, wherein the support pole and the diffuser plate are formed integrally through injection molding, and the support pole extends to the face of the backplate, provided with the light source, along a direction perpendicular to the diffuser plate.

3. The backlight source according to claim 2, comprising a plurality of the light sources and a plurality of the support poles, wherein the plurality of the light sources is evenly and equally spaced, and free ends of the plurality of the support poles are located in spacing regions between the light sources respectively.

4. The backlight source according to claim 3, wherein the plurality of the support poles is identically shaped and equally spaced, and orthographic projections of the support poles onto the backplate are located in the spacing regions between the light sources.

5. The backlight source according to claim 4, wherein a shape of the support pole comprises an inverted frustum of cone shape, a cylinder shape, and an inverted frustum of pyramid shape.

6. The backlight source according to claim 4, wherein a height of the support pole is configured to enable the diffuser plate to evenly mix and diffuse light emitted from the light source.

7. The backlight source according to claim 3, wherein a shape of the support pole comprises an inverted frustum of cone shape, a cylinder shape, and an inverted frustum of pyramid shape.

8. The backlight source according to claim 3, wherein a height of the support pole is configured to enable the diffuser plate to evenly mix and diffuse light emitted from the light source.

9. The backlight source according to claim 2, wherein a shape of the support pole comprises an inverted frustum of cone shape, a cylinder shape, and an inverted frustum of pyramid shape.

10. The backlight source according to claim 2, wherein a height of the support pole is configured to enable the diffuser plate to evenly mix and diffuse light emitted from the light source.

11. The backlight source according to claim 1, wherein a shape of the support pole comprises an inverted frustum of cone shape, a cylinder shape, and an inverted frustum of pyramid shape.

12. The backlight source according to claim 11, wherein a height of the support pole is configured to enable the diffuser plate to evenly mix and diffuse light emitted from the light source.

13. The backlight source according to claim 1, wherein a height of the support pole is configured to enable the diffuser plate to evenly mix and diffuse light emitted from the light source.

14. The backlight source according to claim 13, wherein the support pole and the diffuser plate are formed using a material of polycarbonate, styrol copolymer or polystyrene.

15. The backlight source according to claim 1, wherein the light-emitting particles adopt neodymium or europium.

16. The backlight source according to claim 1, wherein a reflector sheet is further provided between the backplate and the diffuser plate, and the reflector sheet is provided with a through hole at a region corresponding to the light source, the light emitted from the light source is configured to pass through the through hole and point to the diffuser plate, and an free end of the support pole contacts with the reflector sheet.

17. The backlight source according to claim 1 wherein an optical film is provided above the diffuser plate and configured for performing an optical processing for the light passing through the diffuser plate.

18. A display device comprising a display panel and a backlight source, wherein
the backlight source comprises a backplate, a light source and a diffuser plate; the light source is provided on a face of the backplate, the diffuser plate is parallel to the face of the backplate, and the diffuser plate is provided at a side of the backplate, where the light source is provided, and is opposite to light source; and a support pole is further provided between the diffuser plate and the backplate, and the support pole and the diffuser plate are made of a same material and are formed integrally,
wherein the support pole comprises light-emitting particles embedded therein, the light-emitting particles are configured to give out light in response to being irradiated by the light source,
wherein the support pole is of a tapered shape and has a fixed end that is connected to the diffuser plate and a free end opposite to the fixed end, the sectional area of the fixed end is greater than that of the free end.

* * * * *